(12) United States Patent
Wu

(10) Patent No.: US 8,371,768 B1
(45) Date of Patent: Feb. 12, 2013

(54) CONNECTIN UNIT FOR TUBES

(75) Inventor: Yung-Yuan Wu, Changhua Hsien (TW)

(73) Assignee: Alupro Enterprise Co., Ltd., Changhua Hsien (TW)

( * ) Notice: Subject to any disclaimer, the term of this patent is extended or adjusted under 35 U.S.C. 154(b) by 226 days.

(21) Appl. No.: 13/011,656

(22) Filed: Jan. 21, 2011

(51) Int. Cl.
*F16B 7/00* (2006.01)

(52) U.S. Cl. .......... 403/294; 403/292; 403/355

(58) Field of Classification Search ........ 285/321, 285/305, 397, 404, 403; 403/292, 294, 293, 403/355, 319; 108/158.11, 158, 158.12; 211/105.1–105.6
See application file for complete search history.

(56) References Cited

U.S. PATENT DOCUMENTS

| | | | | |
|---|---|---|---|---|
| 2,260,811 A | * | 10/1941 | Kozak | 403/19 |
| 3,104,757 A | * | 9/1963 | Dougherty et al. | 198/666 |
| 3,822,074 A | * | 7/1974 | Welcker | 285/305 |
| 4,691,818 A | * | 9/1987 | Weber | 198/666 |
| 5,078,534 A | * | 1/1992 | White | 403/292 |
| 6,447,028 B1 | * | 9/2002 | LaMarca et al. | 285/404 |
| 7,854,564 B1 | * | 12/2010 | Erickson | 403/379.3 |

* cited by examiner

*Primary Examiner* — Aaron Dunwoody
(74) *Attorney, Agent, or Firm* — Pro-TECHTOR Int'l Services

(57) ABSTRACT

A connection unit includes a hollow first part, a hollow second part and two positioning wires. The first part includes a positioning hole defined radially therein and an insertion section extends from an end of the first part. A groove is defined radially in an outer surface of the insertion section. The second part is securely inserted in one end of a hollow tube and the two positioning wires are located in the second part and two ends of each of the positioning wires are engaged with two insertion holes defined in the second part. The second part is mounted to the insertion section of the first part, and the two positioning wires are engaged with the groove so that the first part is rotatable. Two ends of a connector are inserted into two respective first parts respectively and positioned by two pins.

6 Claims, 10 Drawing Sheets

CONNECTIN UNIT FOR TUBES

FIELD OF THE INVENTION

The present invention relates to a connection unit, and more particularly, to a connection unit for connecting tubes in different directions.

BACKGROUND OF THE INVENTION

A conventional connection unit is shown in FIG. 10 and generally includes a hollow part 51 which is welded to an end of a hollow tube 50 and the hollow part 5 includes a hole 511. When connecting two hollow tubes 50 which are equipped with two respective hollow parts 51, a connector (not shown) is located between the two respective hollow parts 51 and two ends of the connector are inserted into the two respective hollow parts 51 and are positioned by two pins (not shown) extending through the connector and the two respective hollow parts 51.

However, because the hollow part 51 is welded to the hollow tube 50 so that the position of the hole 511 is not changed. This restricts the connection direction of the connector so that when assembling a frame composed of multiple hollow tubes 50 connected in different directions, the fixed position of the holes 511 restricts the shape and arrangement of the hollow tubes 50 of the assembly.

The present invention intends to provide a connection unit for connecting hollow tubes and the connection unit includes a rotatable part connected to the hollow tube so as to meet different requirements of connection.

SUMMARY OF THE INVENTION

The present invention relates to a connection of tubes and comprises at least one hollow tube and at least one connection unit which includes a hollow first part, a hollow second part and two positioning wires. The first part has a positioning hole defined radially therein and an insertion section extends from an end of the first part. A groove is defined radially in an outer surface of the insertion section. The second part has a flange extending radially from an end thereof which faces the first part. Two insertion holes are defined through a wall of the second part so that the two positioning wires are located in the second part and two ends of each of the positioning wires are engaged with the insertion holes. The second part is securely inserted in an end of the at least one hollow tube and mounted to the insertion section of the first part. The two positioning wires are engaged with the groove so that the first part is rotatable relative to the second part. At least one connector has two insertion ends on two ends thereof and each insertion end has a passage defined radially therethrough. The two insertion ends are inserted into two respective first parts respectively. Two pins are inserted into the positioning holes of the two respective first parts and the passages of the at least one connector.

Each of the pins includes a tapered surface at an end thereof and the second part can be made of metal or plastic. The second part is welded to the at least one hollow tube. The at least one hollow tube and the connector are made of metal.

The primary object of the present invention is to provide a connection unit for connecting tubes wherein the first part of the connection unit is rotatable relative to the second part which is secured to the hollow tube so that when connecting the tubes, the rotatable first part allows the connection to be made from any direction.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
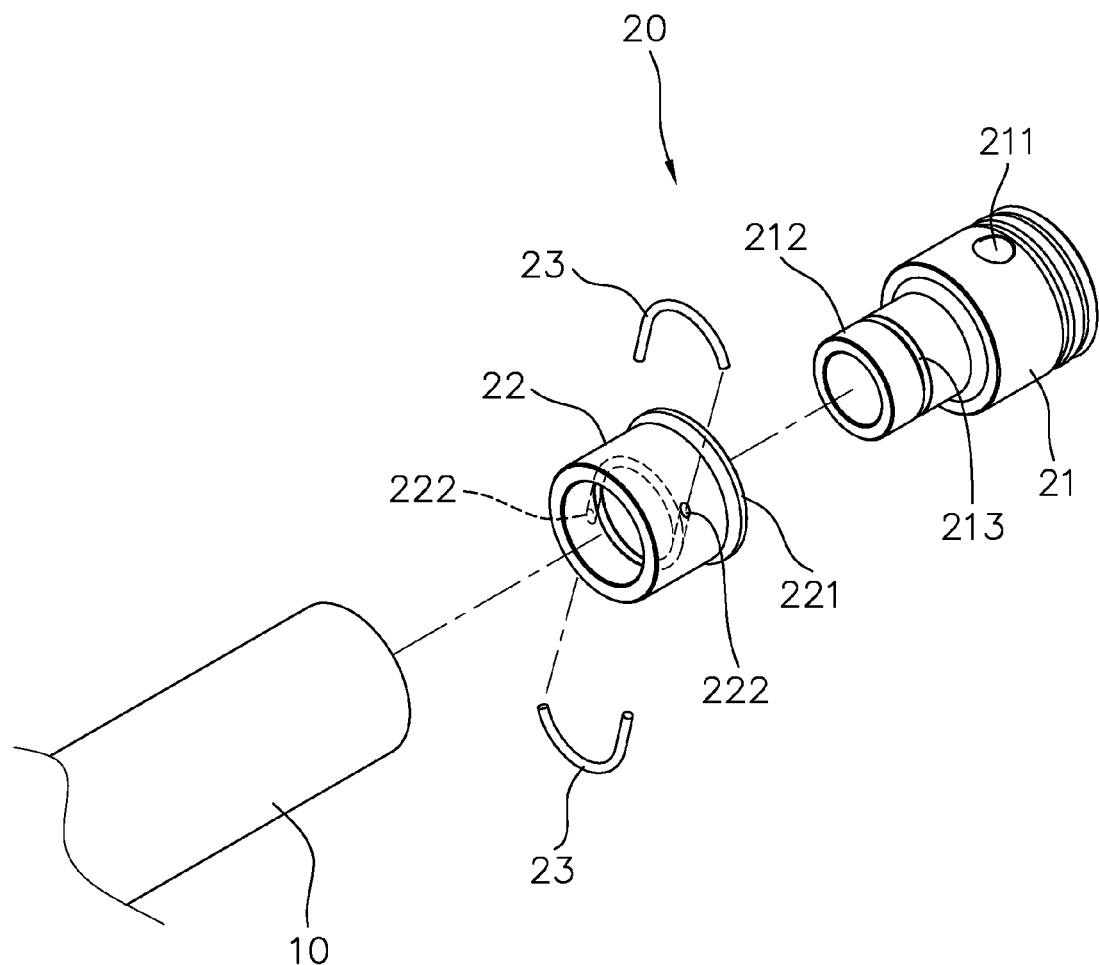
FIG. 1 is an exploded view to show a hollow tube and the connection unit of the present invention.
Figure 2:
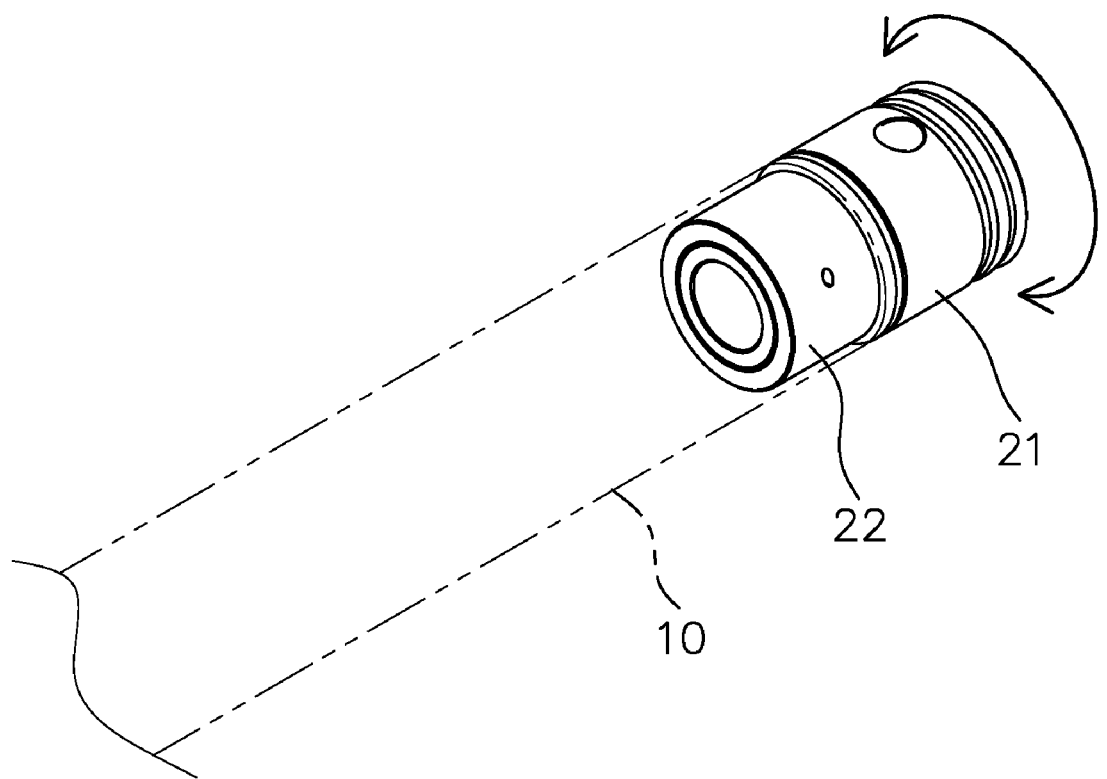
FIG. 2 is a perspective view to show that the connection unit of the present invention is connected to the hollow tube.
Figure 3:
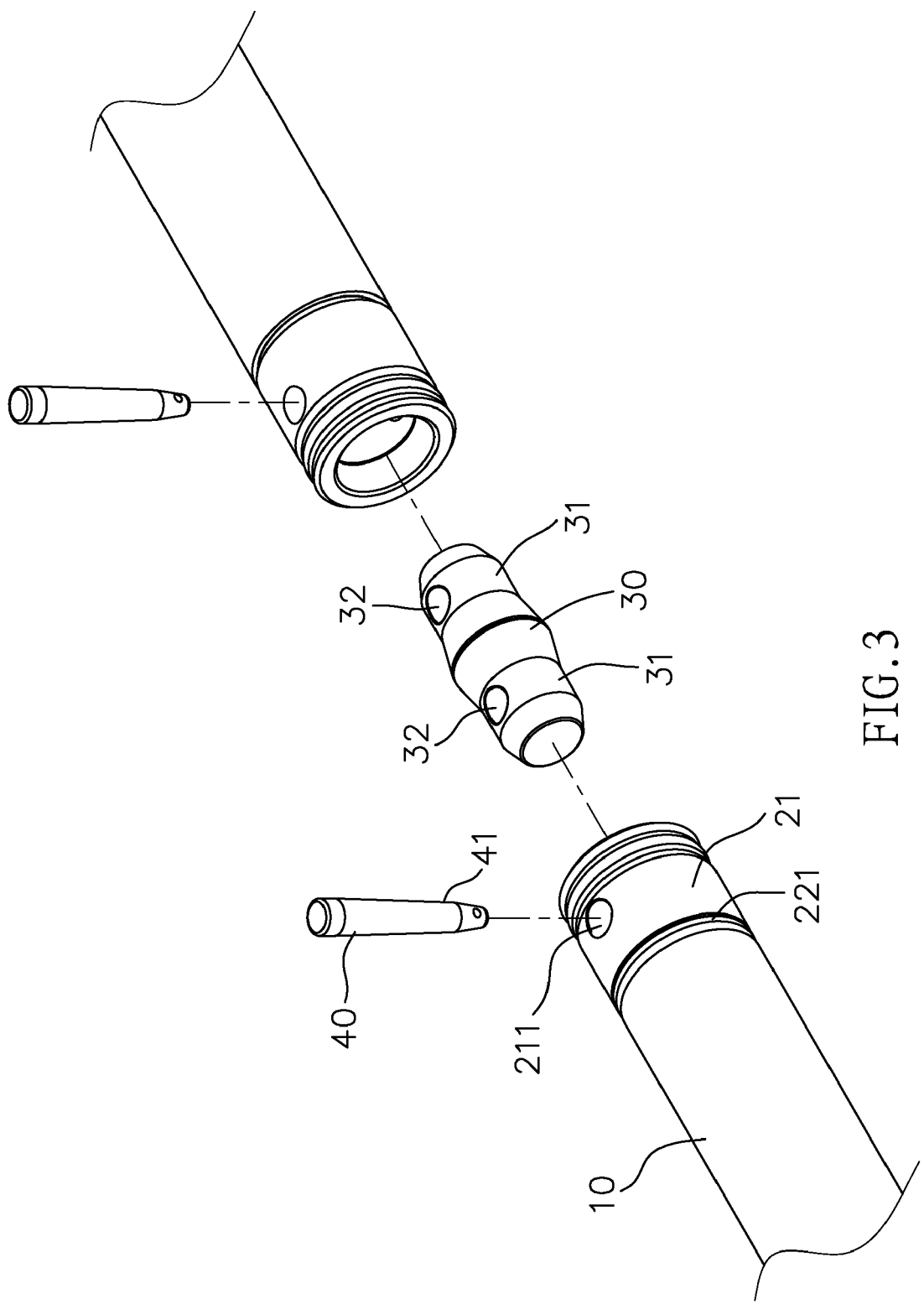
FIG. 3 shows two hollow tubes with two connection units connected thereto and a connector is to be connected between the two connection units.

Referring to FIGS. 1 to 3, the connection of tubes of the present invention comprises at least one hollow tube 10 which is made of metal. At least one connection unit 20 includes a hollow first part 21, a hollow second part 22 and two positioning wires 23. The first part 21 includes a positioning hole 211 defined radially therein and an insertion section 212 extends from an end of the first part 21. A groove 213 is defined radially in an outer surface of the insertion section 212. The second part 22 has a flange 212 extending radially from an end thereof which faces the first part 21. Two insertion holes 222 are defined through a wall of the second part 22 so that the two positioning wires 23 are located in the second part 22 and two ends of each of the positioning wires 23 are engaged with the insertion holes 222. The second part 22 is securely inserted in an end of the at least one hollow tube 10 such as by way welding, and the second part 22 is mounted to the insertion section 212 of the first part 21. The two positioning wires 23 are engaged with the groove 213 so that the first part 21 is rotatable relative to the second part 22.

At least one connector 30 includes two insertion ends 31 on two ends thereof and each insertion end 31 has a passage 32 defined radially therethrough. The two insertion ends 31 are inserted into two respective first parts 21 respectively.

Two pins 40 are inserted into the positioning holes 211 of the two respective first parts 21 and the passages 32 of the at least one connector 30 to connect the two hollow tubes 10. Each of the pins 40 includes a tapered surface 41 at an end thereof for convenience of inserting the positioning holes 211 and the passages 32.

The second part 22 is made of metal or plastic and the connector 30 is made of metal. The connector 30 can be beads, rollers or bearings. The at least one hollow tube 10 is made of metal.

Figure 4:
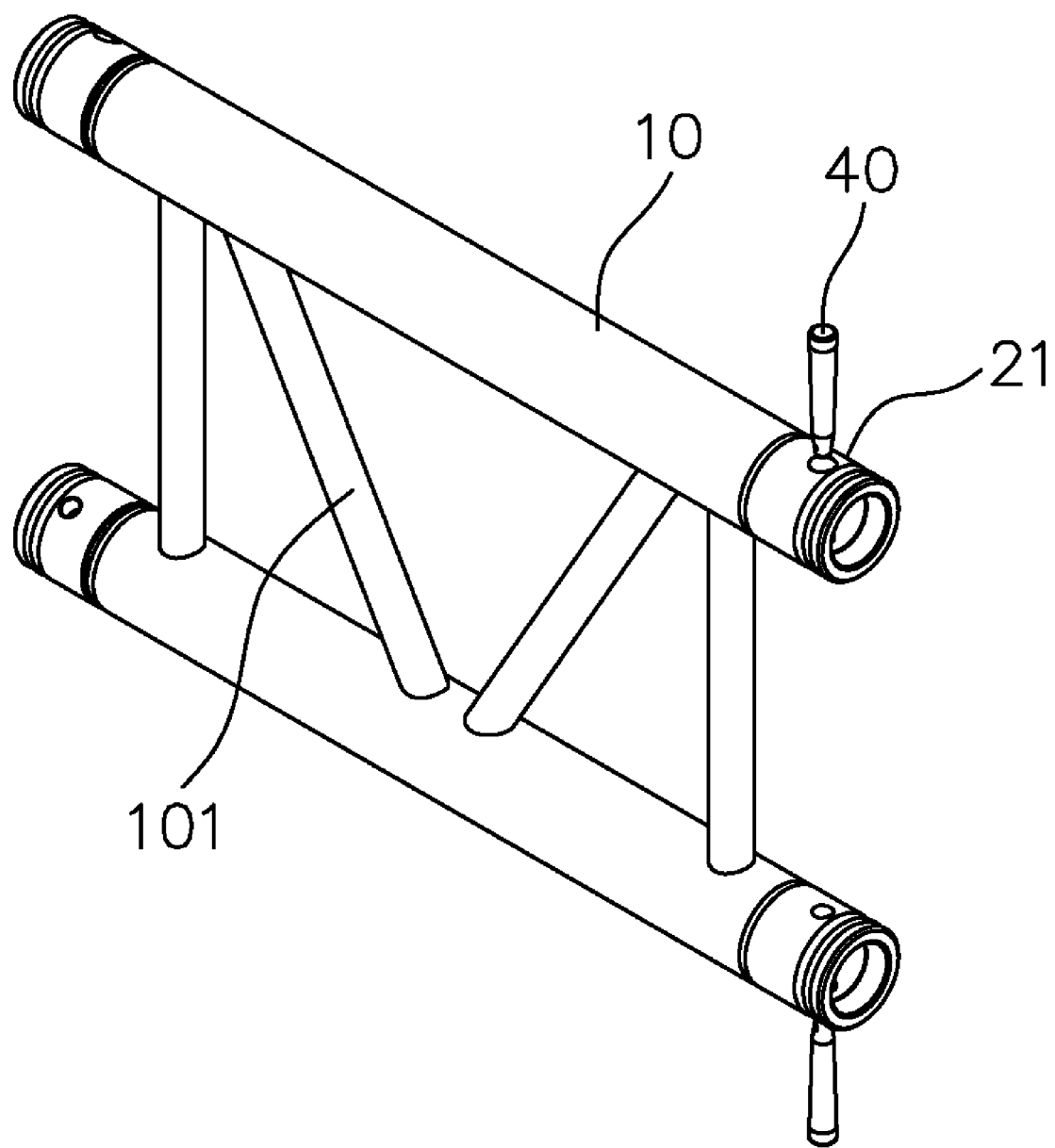
FIG. 4 shows two hollow tubes with the connection units of the present invention and rods are connected between the two hollow tubes.

As shown in FIGS. 4 to 9, when connecting two hollow tubes 10 as shown in FIG. 4, simply inserting the insertion ends 31 of the connector 30 to the two first parts 21 of the two hollow tubes 10, and two pins 40 are inserted into the positioning holes 211 of the two respective first parts 21 and the passages 32 of the at least one connector 30 to connect the two hollow tubes 10. Thanks to the rotatable first parts 21, the hollow tubes 10 can be assembled in different shapes and directions.

Figure 5:
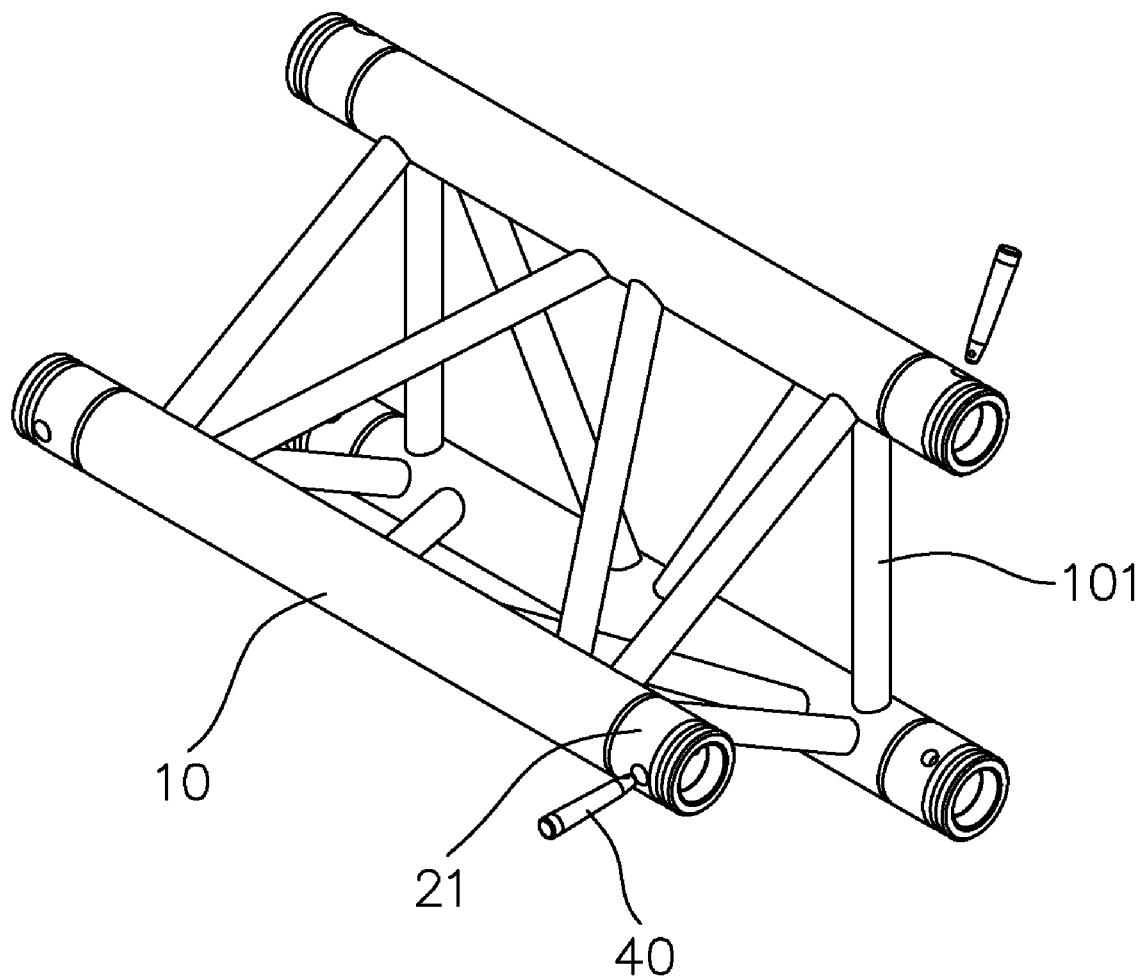
FIG. 5 shows three hollow tubes with the connection units of the present invention and rods are connected between the three hollow tubes.
Figure 6:
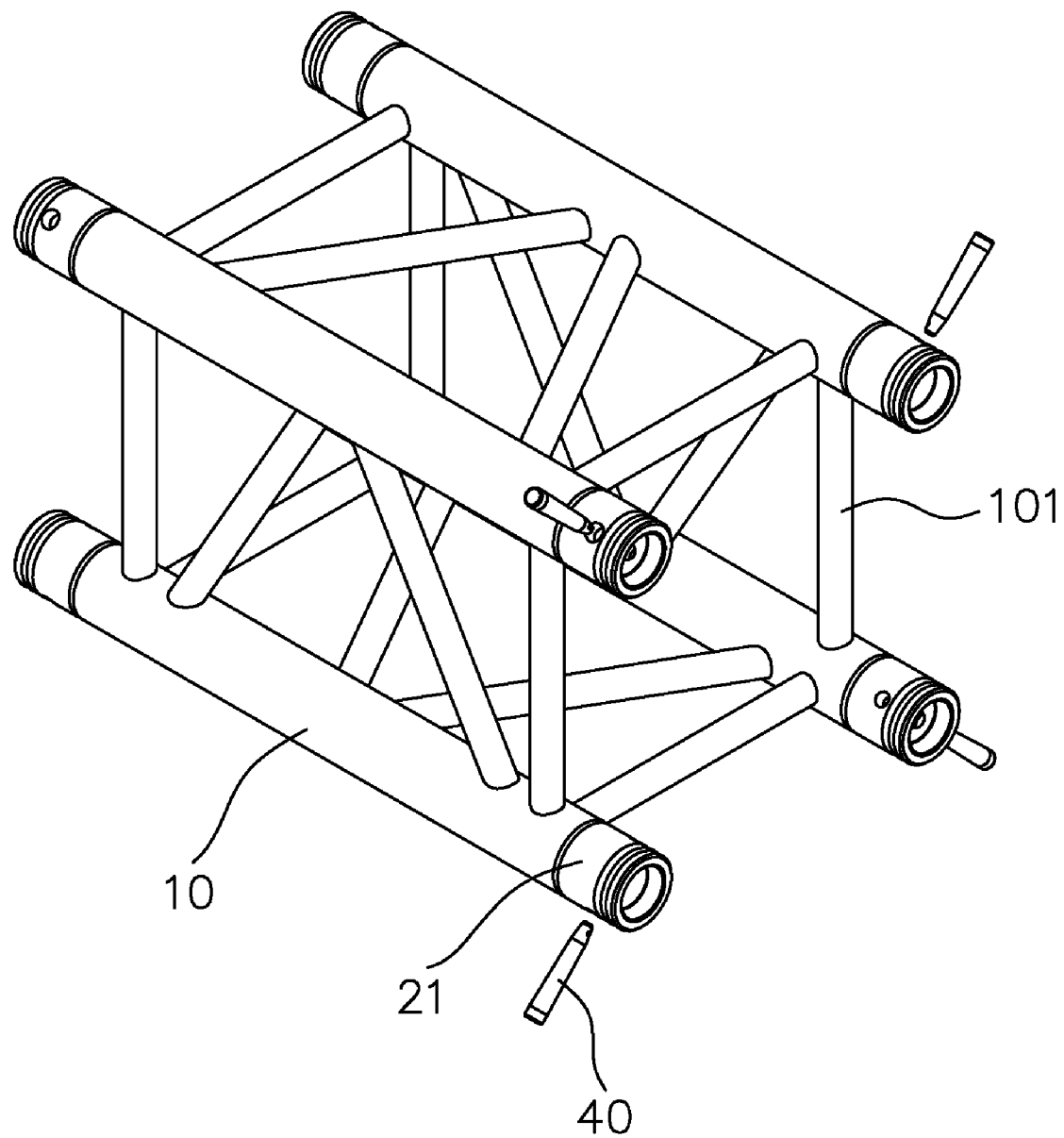
FIG. 6 shows four hollow tubes with the connection units of the present invention and rods are connected between the four hollow tubes.
Figure 7:
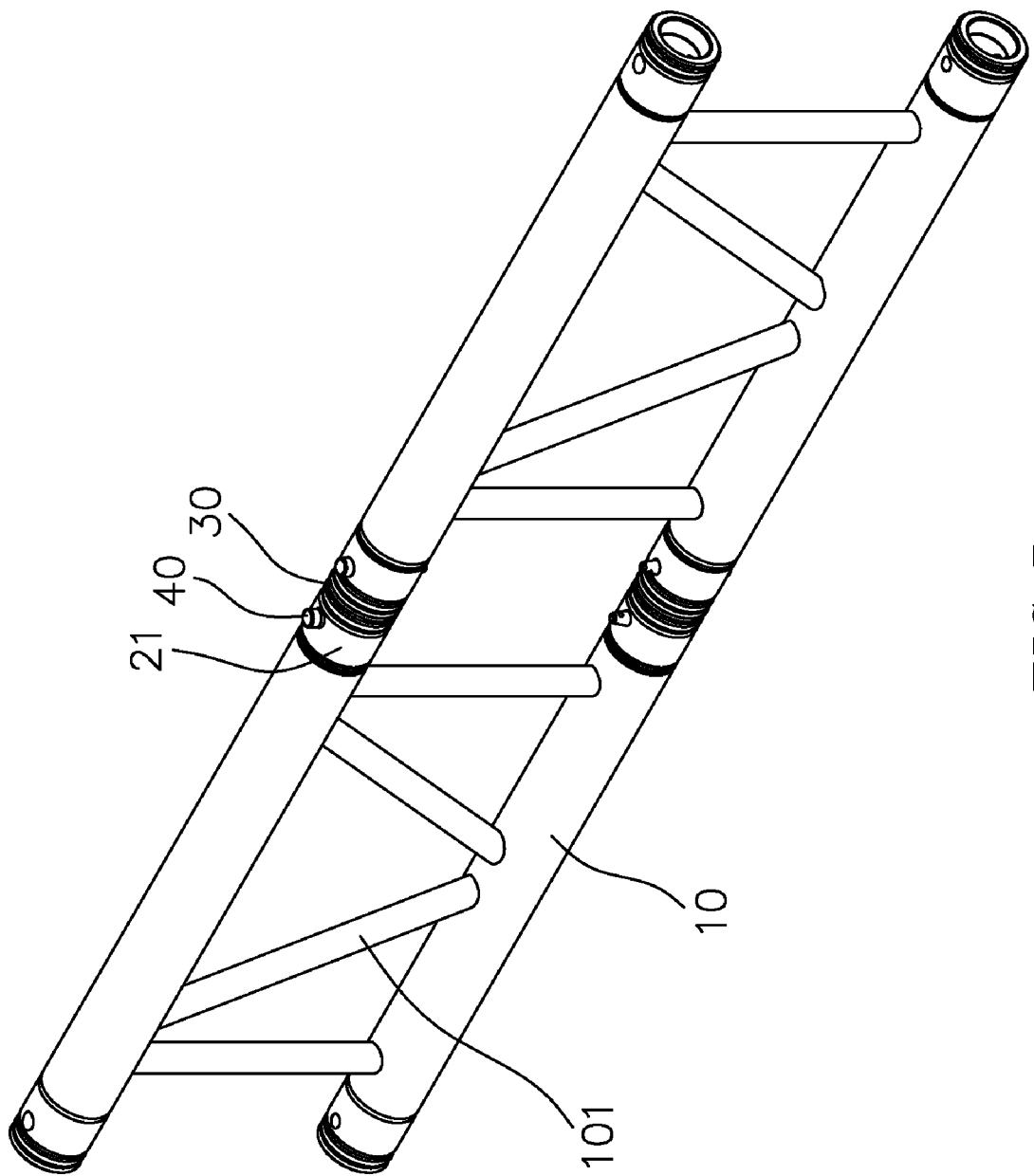
FIG. 7 shows two sets of the hollow tubes in FIG. 4 are connected to each other.
Figure 8:
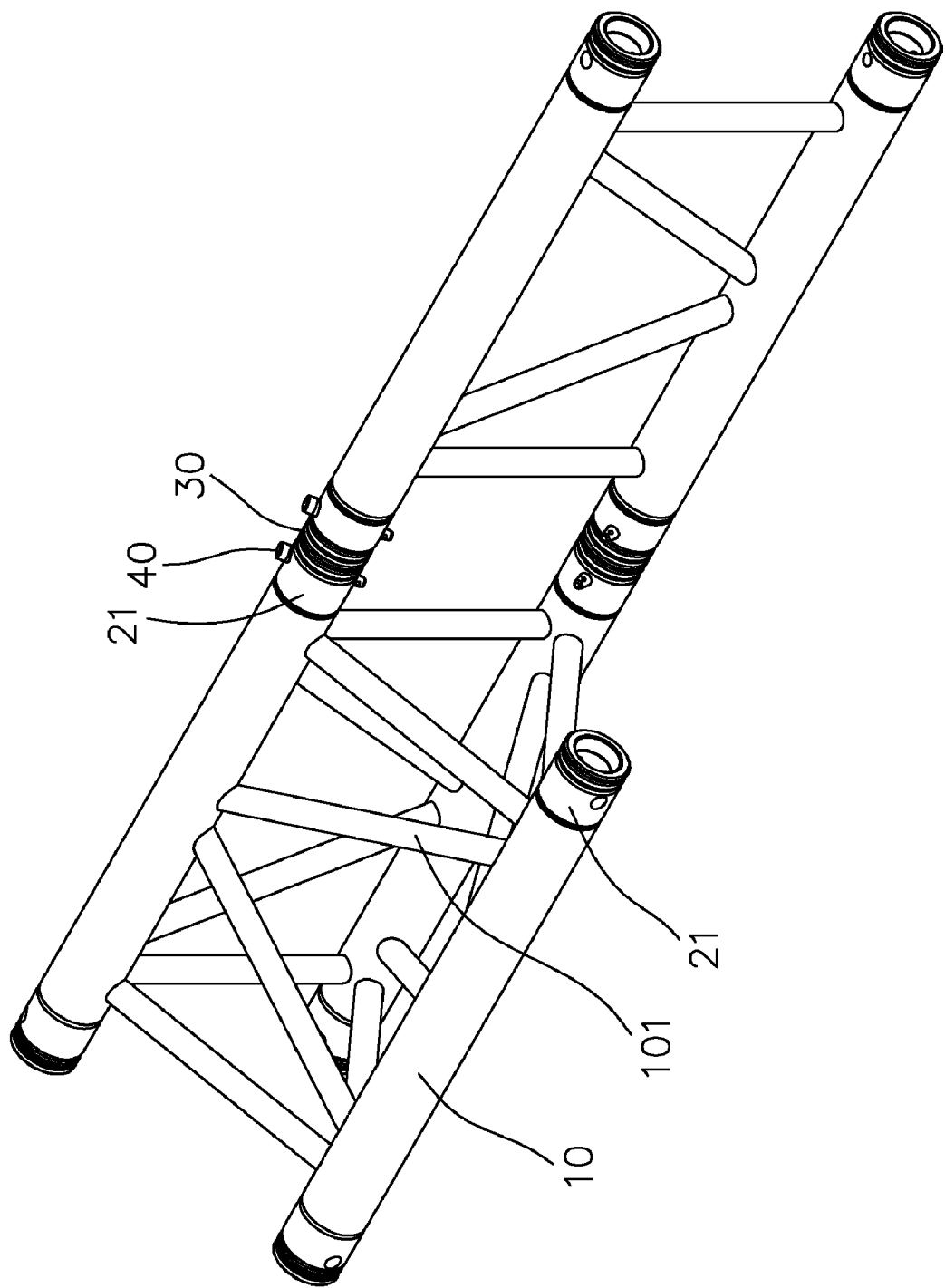
FIG. 8 shows two sets of the hollow tubes in FIGS. 4 and 5 are connected to each other.
Figure 9:
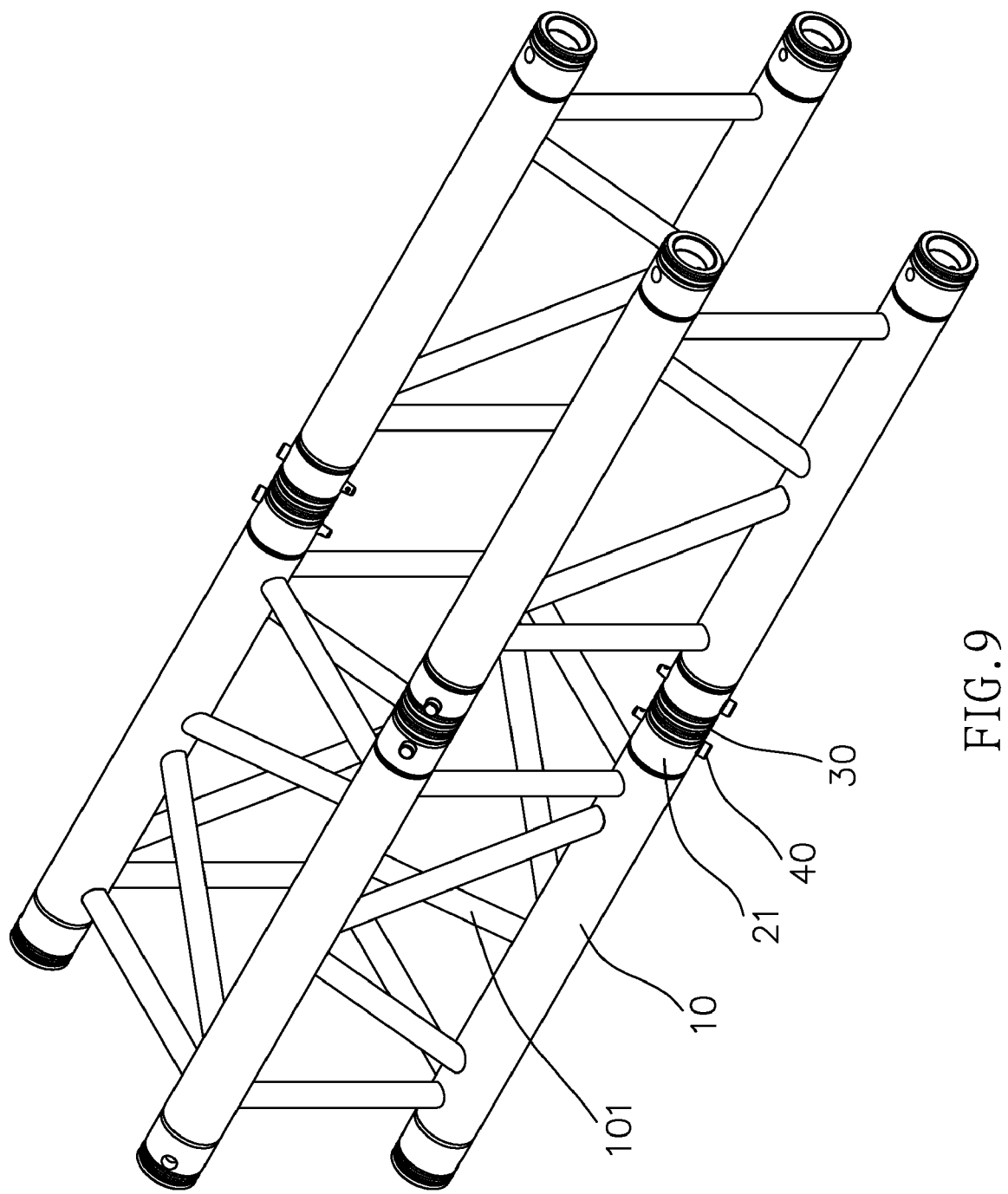
FIG. 9 shows two sets of the hollow tubes in FIG. 4 and the hollow tubes in FIG. 6 are connected to each other.
Figure 10:
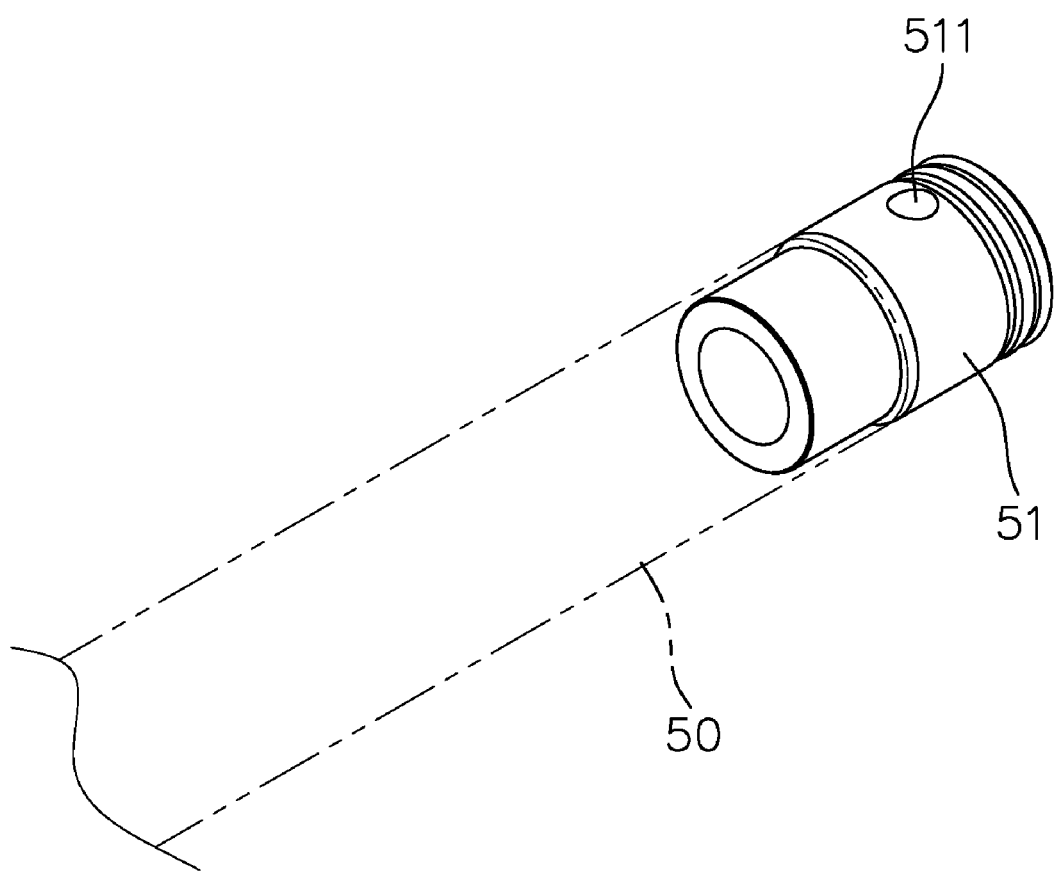
FIG. 10 shows the conventional connection unit for tubes.

FIG. 4 shows that two parallel hollow tubes 10 with the connection units 20 are connected by rods and FIG. 5 shows that three parallel hollow tubes 10 with the connection units of the present invention are connected by the rods 101. FIG. 6 shows that four parallel hollow tubes 10 with the connection units of the present invention are connected by the rods 101. FIG. 7 shows that two sets of the hollow tubes 10 in FIG. 4 are connected to each other by suing the pins 40. FIG. 8 shows that two sets of the hollow tubes 10 in FIGS. 4 and 5 are connected to each other by pins 40. FIG. 9 shows that two sets of the hollow tubes 10 in FIG. 4 and the hollow tubes 10 in FIG. 6 are connected to each other by using four pins 40.

The rotatable first part 21 of the connection unit of the present invention allows the connection of the hollow tubes 10 to be flexible and efficient.

While we have shown and described the embodiment in accordance with the present invention, it should be clear to those skilled in the art that further embodiments may be made without departing from the scope of the present invention.

What is claimed is:

1. A connection of tubes comprising:
   at least one hollow tube;
   at least one connection unit including a hollow first part, a hollow second part and two positioning wires, the first part having a positioning hole defined radially therein and an insertion section extending from an end of the first part, a groove defined radially in an outer surface of the insertion section, the second part having a flange extending radially from an end thereof which faces the first part, two insertion holes defined through a wall of the second part so that the two positioning wires are located in the second part and two ends of each of the positioning wires engaged with the insertion holes, the second part securely inserted in an end of the at least one hollow tube and mounted to the insertion section of the first part, the two positioning wires engaged with the groove;
   at least one connector having two insertion ends on two ends thereof and each insertion end having a passage defined radially therethrough, the two insertion ends inserted into two respective first parts respectively, and
   two pins inserted into the positioning holes of the two respective first parts and the passages of the at least one connector.

2. The connection of tubes as claimed in claim 1, wherein each of the pins includes a tapered surface at an end thereof.

3. The connection of tubes as claimed in claim 1, wherein the second part is made of metal or plastic.

4. The connection of tubes as claimed in claim 1, wherein the second part is welded to the at least one hollow tube.

5. The connection of tubes as claimed in claim 1, wherein the connector is made of metal.

6. The connection of tubes as claimed in claim 1, wherein the at least one hollow tube is made of metal.

* * * * *